US00RE49684E

(19) United States
(12) Reissued Patent
Anderson et al.

(10) Patent Number: US RE49,684 E
(45) Date of Reissued Patent: Oct. 3, 2023

(54) LEVERAGING POINT INFERENCES ON HTTP TRANSACTIONS FOR HTTPS MALWARE DETECTION

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

(21) Appl. No.: 17/463,337

(22) Filed: Aug. 31, 2021

Related U.S. Patent Documents

Reissue of:
(64) Patent No.: 10,805,341
Issued: Oct. 13, 2020
Appl. No.: 15/889,392
Filed: Feb. 6, 2018

(51) Int. Cl.
*H04L 9/40* (2022.01)
*G06N 20/00* (2019.01)
(Continued)

(52) U.S. Cl.
CPC ..... *H04L 63/145* (2013.01); *G06N 20/00* (2019.01); *H04L 63/1425* (2013.01);
(Continued)

(58) Field of Classification Search
CPC . H04L 63/166; H04L 63/145; H04L 63/1425; H04L 67/01; H04L 67/02; H04L 63/1441; H04L 41/14; G06N 20/00
See application file for complete search history.

(56) References Cited

U.S. PATENT DOCUMENTS 8,539,221 B2 9/2013 Tremblay et al.
9,094,288 B1 7/2015 Nucci et al.
(Continued)

FOREIGN PATENT DOCUMENTS

CA 3006343 A1 * 11/2016 ..... H04L 47/12
CN 106603519 A 4/2017

OTHER PUBLICATIONS

Cai, et al., "Touching from a Distance: Website Fingerprinting Attacks and Defenses", CCS'12, Oct. 16-18, 2012, Raleigh, North Carolina, USA., 12 pages, 2012, ACM.
(Continued)

*Primary Examiner* — Jalatee Worjloh
(74) *Attorney, Agent, or Firm* — BEHMKE INNOVATION GROUP LLC; James M. Behmke; Jonathon P. Western

(57) ABSTRACT

In one embodiment, a traffic analysis service receives captured traffic data regarding a Transport Layer Security (TLS) connection between a client and a server. The traffic analysis service applies a first machine learning-based classifier to TLS records from the traffic data, to identify a set of the TLS records that include Hypertext Transfer Protocol (HTTP) header information. The traffic analysis service estimates one or more HTTP transaction labels for the connection by applying a second machine learning-based classifier to the identified set of TLS records that include HTTP header information. The traffic analysis service augments the captured traffic data with the one or more HTTP transaction labels. The traffic analysis service causes performance of a network security function based on the augmented traffic data.

32 Claims, 11 Drawing Sheets

(51) Int. Cl.

| | |
|---|---|
| ***H04L 67/01*** | (2022.01) |
| ***H04L 41/14*** | (2022.01) |
| ***H04L 67/02*** | (2022.01) |
| ***H04L 69/326*** | (2022.01) |

(52) U.S. Cl.

CPC ..... *H04L 63/166* (2013.01); *H04L 41/14* (2013.01); *H04L 63/1441* (2013.01); *H04L 67/01* (2022.05); *H04L 67/02* (2013.01); *H04L 69/326* (2013.01)

(56) References Cited

U.S. PATENT DOCUMENTS

| | | | | |
|---|---|---|---|---|
| 9,813,310 | B1 | 11/2017 | Sieracki | |
| 10,038,706 | B2 * | 7/2018 | Mekky | H04L 63/1433 |
| 10,075,454 | B1 | 9/2018 | Parikh et al. | |
| 10,484,399 | B1 * | 11/2019 | Curtin | G06F 17/11 |
| 11,509,685 | B2 * | 11/2022 | Jaladi | H04L 63/1416 |
| 2012/0039337 | A1 | 2/2012 | Jackowski et al. | |
| 2013/0347114 | A1 * | 12/2013 | Altman | G06F 21/52 726/24 |
| 2015/0128263 | A1 | 5/2015 | Raugas et al. | |
| 2016/0080230 | A1 | 3/2016 | Anand et al. | |
| 2016/0149943 | A1 | 5/2016 | Kaloroumakis et al. | |
| 2016/0323186 | A1 * | 11/2016 | Dillon | H04L 67/02 |
| 2017/0134404 | A1 | 5/2017 | Machlica et al. | |
| 2017/0223032 | A1 | 8/2017 | El-Moussa et al. | |
| 2017/0244737 | A1 * | 8/2017 | Kuperman | G06N 3/04 |
| 2017/0264626 | A1 | 9/2017 | Xu et al. | |
| 2017/0330107 | A1 * | 11/2017 | Gonzalez Sanchez | H04L 43/026 |
| 2017/0359368 | A1 | 12/2017 | Hodgman et al. | H04L 63/1441 |
| 2018/0115566 | A1 | 4/2018 | Azvine et al. | |
| 2018/0124085 | A1 | 5/2018 | Frayman et al. | |
| 2018/0152467 | A1 | 5/2018 | Anderson et al. | |
| 2018/0307833 | A1 | 10/2018 | Noeth et al. | |

OTHER PUBLICATIONS

Hyoyoung Lim et al., "Malware Classification Method Based on Sequence of Traffic Flow", DOI: 10.5220/0005235002300237, Proceedings of the 1$^{s}$ t International Conference on Information Systems Security and Privacy, (ICISSP-2015), pp. 230-237.

International Search Report dated May 17, 2019 in connection with PCT/US2019/016446.

Yamada, A. et al.: "Intrusion Detection System to Detect Variant Attacks Using Learning Algorithms with Automatic Generation of Training Data", Information Technology: Coding and Computing, 2005, ITCC 2005, International Conference on Las Vegas, Nevada, USA, Apr. 4-6, 2005, IEEE Computer Society, Los Alamitos, California, vol. 1, Apr. 4, 2005, pp. 650-655.

Bilge, et al., "Disclosure: detecting botnet command and control servers through large-scale NetFlow analysis", ACSAC '12 Proceedings of the 28th Annual Computer Security Applications Conference, pp. 129-138, 2012, ACM.

Shabtai A, et al., "Detection of malicious code by applying machine learning classifiers on static features: A state-of-the-art survey", Information Security Technical Report, 14 pages, 2009, Elsevier Ltd.

* cited by examiner

710

| | HTML | JS | IMAGE | VIDEO | CSS | OCTET | JSON | FONT | PLAIN |
|---|---|---|---|---|---|---|---|---|---|
| HTML | 0.89 | 0.02 | 0.03 | 0.00 | 0.00 | 0.00 | 0.01 | 0.00 | 0.05 |
| JS | 0.02 | 0.87 | 0.08 | 0.00 | 0.02 | 0.00 | 0.00 | 0.00 | 0.00 |
| IMAGE | 0.01 | 0.07 | 0.90 | 0.00 | 0.01 | 0.00 | 0.00 | 0.00 | 0.00 |
| VIDEO | 0.07 | 0.10 | 0.17 | 0.65 | 0.00 | 0.01 | 0.00 | 0.00 | 0.00 |
| CSS | 0.02 | 0.14 | 0.11 | 0.00 | 0.72 | 0.00 | 0.00 | 0.00 | 0.00 |
| OCTET | 0.02 | 0.05 | 0.12 | 0.01 | 0.00 | 0.79 | 0.00 | 0.00 | 0.00 |
| JSON | 0.04 | 0.06 | 0.09 | 0.00 | 0.00 | 0.00 | 0.78 | 0.00 | 0.02 |
| FONT | 0.00 | 0.06 | 0.04 | 0.00 | 0.00 | 0.00 | 0.00 | 0.90 | 0.00 |
| PLAIN | 0.13 | 0.06 | 0.22 | 0.00 | 0.00 | 0.02 | 0.08 | 0.00 | 0.50 |

FIG. 7B

700

| | HTML | JS | IMAGE | VIDEO | CSS | OCTET | JSON | FONT | PLAIN |
|---|---|---|---|---|---|---|---|---|---|
| HTML | 0.96 | 0.01 | 0.02 | 0.00 | 0.00 | 0.00 | 0.00 | 0.00 | 0.00 |
| JS | 0.00 | 0.94 | 0.04 | 0.00 | 0.01 | 0.00 | 0.00 | 0.00 | 0.00 |
| IMAGE | 0.00 | 0.01 | 0.98 | 0.00 | 0.00 | 0.00 | 0.00 | 0.00 | 0.00 |
| VIDEO | 0.05 | 0.01 | 0.04 | 0.90 | 0.00 | 0.00 | 0.00 | 0.00 | 0.00 |
| CSS | 0.01 | 0.08 | 0.09 | 0.00 | 0.82 | 0.00 | 0.00 | 0.00 | 0.00 |
| OCTET | 0.01 | 0.04 | 0.10 | 0.00 | 0.00 | 0.84 | 0.01 | 0.00 | 0.00 |
| JSON | 0.01 | 0.02 | 0.04 | 0.00 | 0.00 | 0.00 | 0.92 | 0.00 | 0.00 |
| FONT | 0.00 | 0.03 | 0.12 | 0.00 | 0.00 | 0.01 | 0.00 | 0.82 | 0.00 |
| PLAIN | 0.02 | 0.00 | 0.02 | 0.00 | 0.00 | 0.00 | 0.01 | 0.00 | 0.95 |

FIG. 7A

LEVERAGING POINT INFERENCES ON HTTP TRANSACTIONS FOR HTTPS MALWARE DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is an application for reissue of U.S. Pat. No. 10,805,341, issued on Oct. 13, 2020, which corresponds to U.S. patent application Ser. No. 15/889,392, filed on Feb. 6, 2018, the disclosure of which is incorporated herein in its entirety by reference.*

TECHNICAL FIELD

The present disclosure relates generally to computer networks, and, more particularly, to leveraging point inferences on Hypertext Transfer Protocol (HTTP) transactions for HTTP Secure (HTTPS) malware detection.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate confusion matrices obtained during testing of the techniques herein;

DESCRIPTION OF EXAMPLE EMBODIMENTS

Overview

Figure 1A:
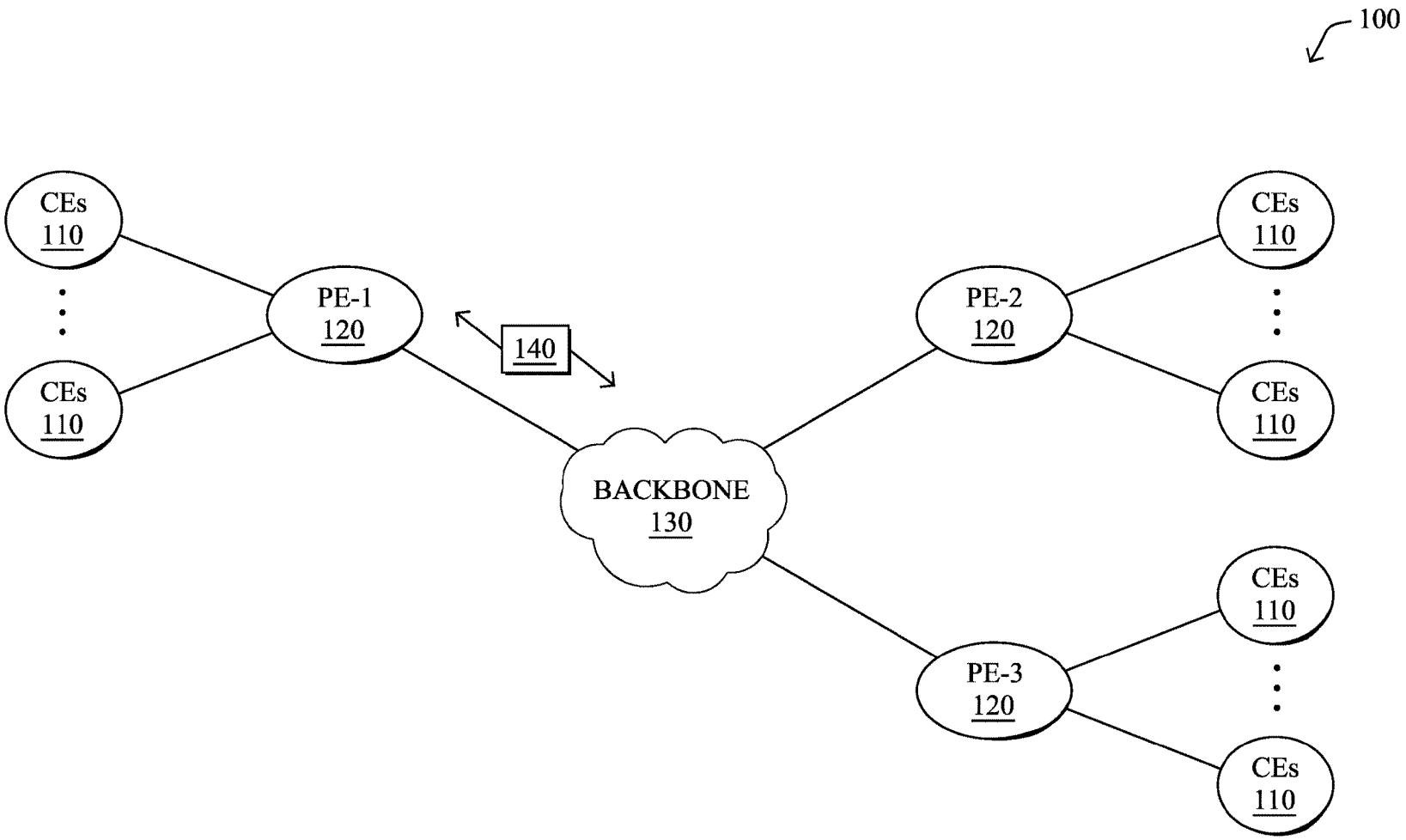
FIGS. 1A-1B illustrate an example communication network.

According to one or more embodiments of the disclosure, a traffic analysis service receives captured traffic data regarding a Transport Layer Security (TLS) connection between a client and a server. The traffic analysis service applies a first machine learning-based classifier to TLS records from the traffic data, to identify a set of the TLS records that include Hypertext Transfer Protocol (HTTP) header information. The traffic analysis service estimates one or more HTTP transaction labels for the connection by applying a second machine learning-based classifier to the identified set of TLS records that include HTTP header information. The traffic analysis service augments the captured traffic data with the one or more HTTP transaction labels. The traffic analysis service causes performance of a network security function based on the augmented traffic data.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
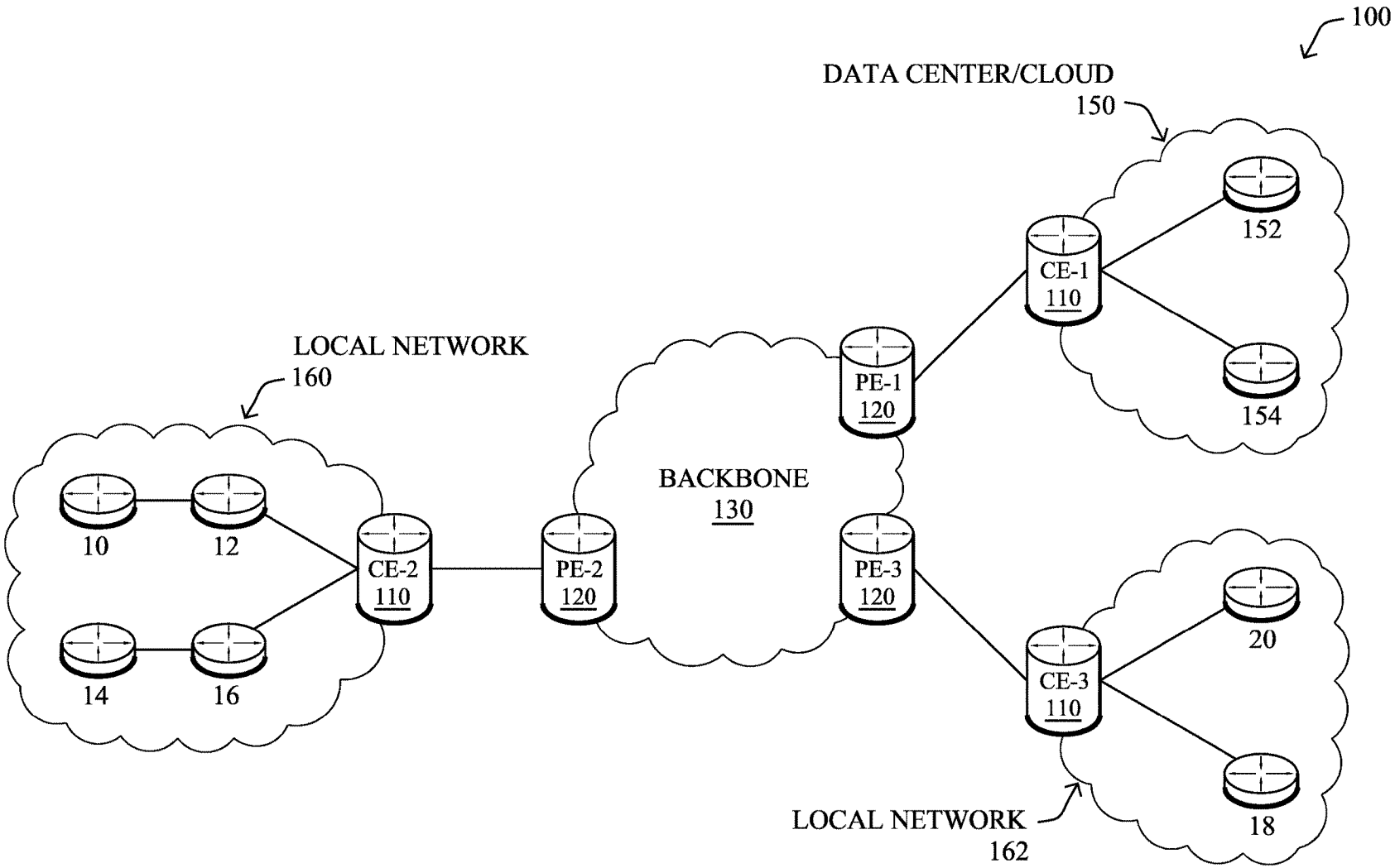

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
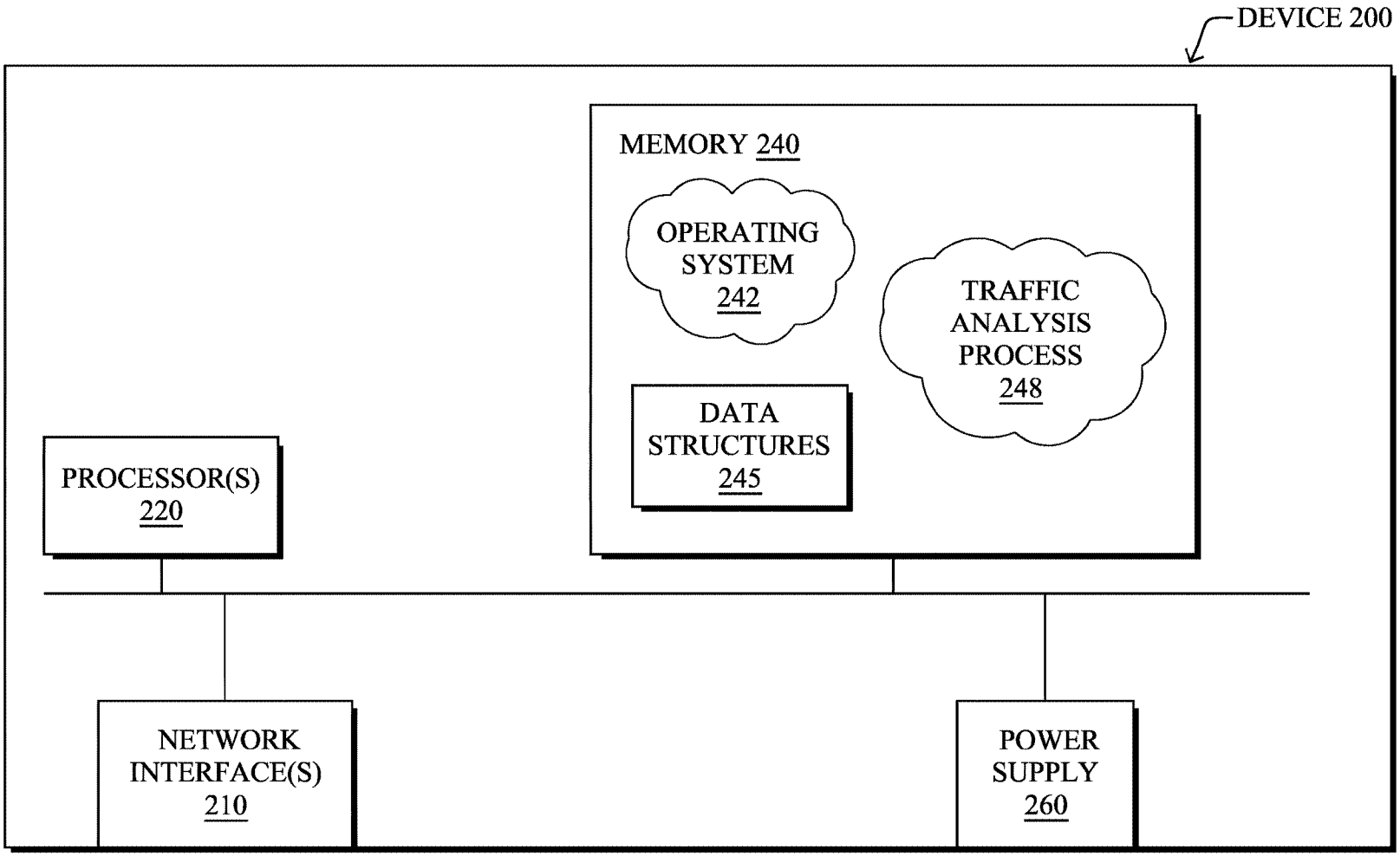
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248 and/or a training process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
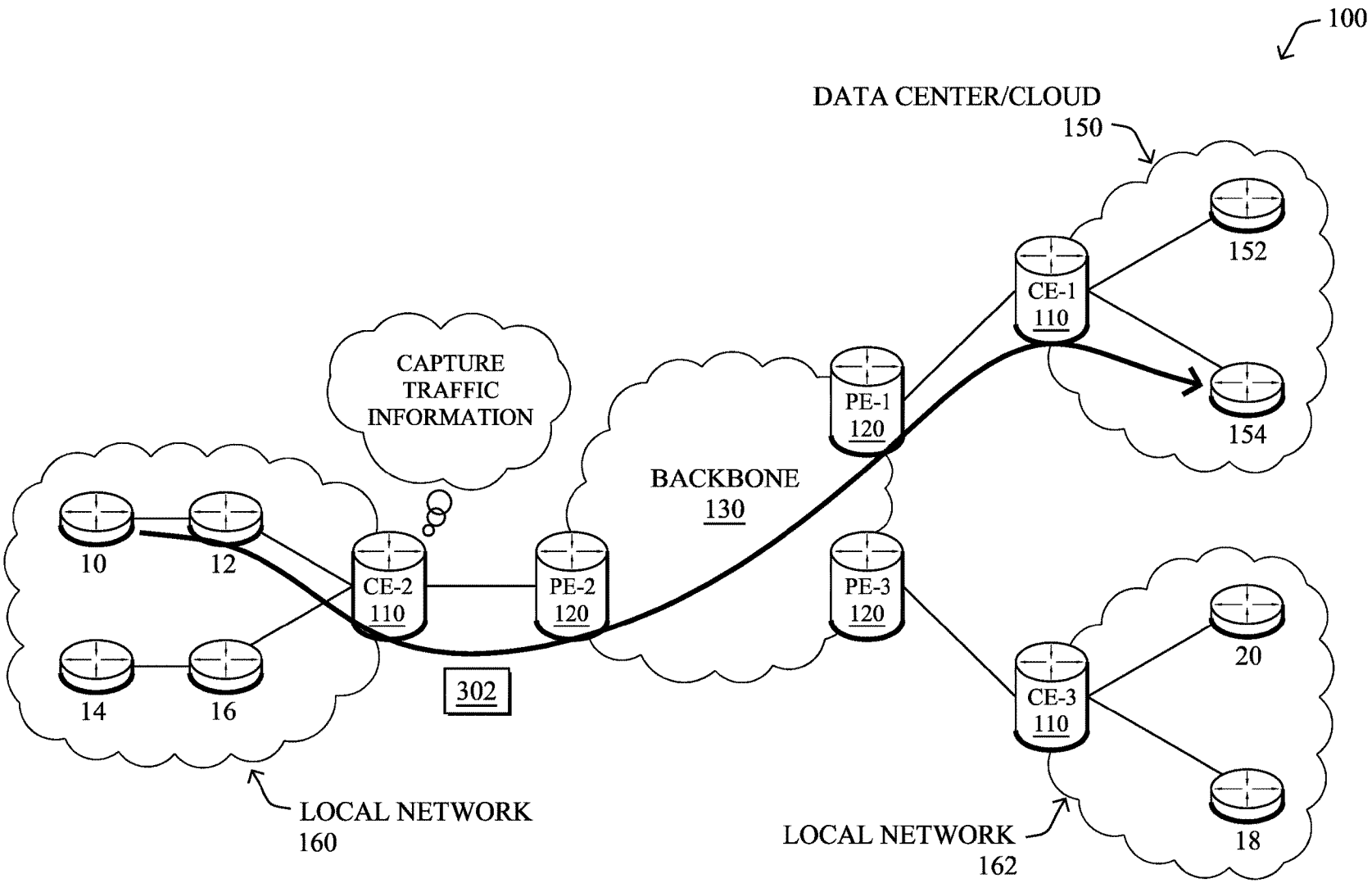
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, captured data features regarding a particular encrypted connection or set of connections in a network can be used to assess the connection(s), such as determining whether one of the connections is malicious (e.g., malware-related). However, this classification is typically performed without regard to what is happening within the encrypted connection(s), instead assuming that the machine learning model will implicitly make use of this data. However, this is not often the case and, as a result, the performance and interpretability of the model may suffer.

Leveraging Point Inferences on HTTP Transactions for HTTPS Malware Detection

The techniques herein allow for inferences to be made regarding the characteristics of HTTP transactions that are conveyed via an HTTP Secure (HTTPS)/Transport Layer Security (TLS) connection. For example, the techniques herein can be used to infer the content-type, server type, and other HTTP header fields of the encrypted traffic, without actually decrypting the traffic. These inferences can then be used for purposes of performing security or other traffic analysis functions, such as determining whether the encrypted connection is associated with malware, performing website fingerprinting, or the like.

Specifically, according to one or more embodiments of the disclosure as described in detail below, a traffic analysis service receives captured traffic data regarding a Transport Layer Security (TLS) connection between a client and a server. The traffic analysis service applies a first machine learning-based classifier to TLS records from the traffic data, to identify a set of the TLS records that include Hypertext Transfer Protocol (HTTP) header information. The traffic analysis service estimates one or more HTTP transaction labels for the connection by applying a second machine learning-based classifier to the identified set of TLS records that include HTTP header information. The traffic analysis service augments the captured traffic data with the one or more HTTP transaction labels. The traffic analysis service causes performance of a network security function based on the augmented traffic data.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein, e.g., by implementing a traffic analysis service for the monitored network.

Operationally, the techniques herein allow point inferences to be made on HTTP transactions within an encrypted tunnel, leveraging machine learning and without the need for decryption of the traffic. Preliminary testing of the techniques herein was performed by using multiple virtual machines (VMs) to collect training data for the machine learning models. Notably, these VMs were used to make connections to the top 10,000 websites according to Alexa, using Firefox and Chrome browsers. For each session, packet captures were made and the master secrets extracted. All sessions were then decrypted, which allowed the encrypted data features that are typically available to be correlated with the obtained features of the decrypted HTTP transactions within the TLS tunnel. The following data features were captured and can be used, in various embodiments, to infer/estimate the HTTP transaction features inside the encrypted connection:

- Flow Level Features:
  - The sequence of TLS record lengths and types
  - The sequence of TCP packet lengths and flags
  - The number of bytes and packets
- Transaction Level Features:
  - The above three data types restricted to packets within the transaction Using the above features, a machine learning-based classifier can be trained to output any or all of the following labels:

- Exact target values—these are well-defined and often present HTTP header fields including but not limited to: method, status-code, server, and content-type
- Binary target values—these are often not present in many HTTP transactions, but their presence does provide information, when available. The can include, but are not limited to, the following:
  - cookie, referer, upgrade-insecure-requests, via, set-cookie, origin, etag In various embodiments, once classifier training is complete, the framework may be as follows:

- Classify individual TLS application data records using a first classifier as either including HTTP Headers or HTTP Data
  - For HTTP/2, this step is a multiclass problem because there are multiple frame types (e.g., headers, data, ping, settings, etc.)
- Segment the TLS flow into transactions.
  - For pipelined requests, an additional HTTP record type is needed in the above classification: HTTP Data_End
  - For multiplexed requests, all of our data suggests the Data_End class would be generally sufficient for current uses of HTTP/2
  - Alternatively, for the general multiplexed case, the traffic analysis service could only identify header records and predefine transactions as a fixed offset of packets, afterwards
- For each transaction, classify all request and response header fields
- Iteratively classify individual transactions for each connection:
  - For the targeted transaction under analysis:
    - add the results of the previous iteration's classifiers of all other transactions within the connection
      - For example, the classifier determining that the other n−1 transactions contained n−2 HTML pages and 1 JSON object would become new features
    - Reclassify the targeted transaction
- For each connection:
  - collect other traffic data features of the connection that can also be useful for analysis—for example, the packet and/or record lengths, TLS metadata, etc.
  - augment that feature set with the estimates HTTP transaction labels from above
  - cause the performance of a network security function, such as classifying the connection as malware-related or benign, performing web site fingerprinting, or the like.

Figure 4:
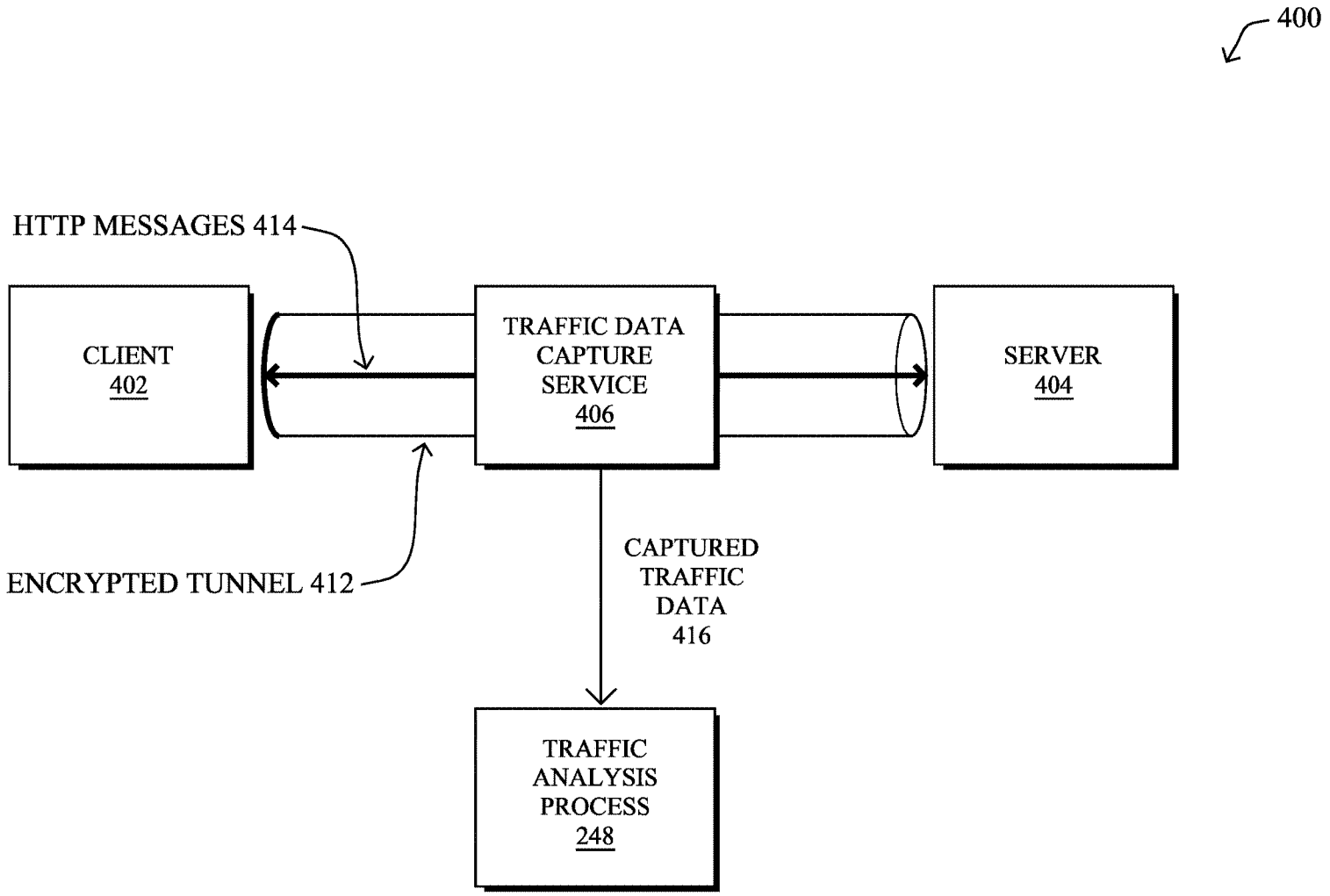
FIG. 4 illustrates an example of a traffic analysis process receiving captured traffic data.

In greater detail, as shown in FIG. 4, assume that a network 400 includes an endpoint client 402 that communicates with a remote server 404. More specifically, endpoint client 402 may execute an application that establishes a connection with server 404 by forming an encrypted tunnel 412 over which HTTP messages 414 may be sent. Notably, in various embodiments, encrypted tunnel 412 may be a TLS tunnel over which HTTP messages 414 may be sent.

Located along the network path between endpoint client 402 and server 404 may be any number of traffic capture services, such as traffic data capture service 406 shown. For example, traffic data capture service 406 may be a switch, router, firewall, server, network controller, or other networking equipment via which encrypted HTTP messages 414 sent between endpoint client 402 and server 404 flows. During operation, traffic traffic data capture service 406 may capture data regarding the encrypted traffic and send the captured traffic data 416 to traffic analysis process 248, which may be used to implement a traffic analysis service in the network. For example, captured traffic data 416 may include Internet Protocol Flow Information Export (IPFIX) records and/or Netflow records regarding encrypted HTTP messages 414, or any other information regarding the traffic.

In various embodiments, traffic data capture server 406 may generate captured traffic data 416 without decrypting the traffic, thereby preserving the privacy of the actual contents of HTTP messages 414. Even though the traffic is not decrypted, traffic analysis process 248 can still assess the information directly available from the traffic (e.g., TLS metadata, packet sizes, etc.), as well as information about HTTP messages 414 that can be inferred.

Specifically, the problem of inferring the semantics of HTTP messages 414 may be framed as a number of disjoint multi-class and binary classification problems. The multi-class classifiers model actual HTTP field values, e.g., "nginx-1.13" for the Server field and "text/html" for the Content-Type field. Conversely, the binary classifiers may model the presence or absence of a field, e.g., the presence of the Cookie or Referer fields in an HTTP request. Many of these values are correlated with the values in the same HTTP transaction or other transactions in the same TLS connection, e.g., text/css and text/javascript objects are often transferred using the same TLS connection. Because of this intuition, traffic analysis process 248 may employ an iterative classification strategy that utilizes the header field inferences of related transactions that were predicted during the previous iteration.

As noted, traffic analysis process 248 may not make any inferences related to directly identifying the body of HTTP messages 414, only inferring header information for HTTP messages 414. Such inferences can enable a network administrator to passively monitor all internal servers to ensure they are patched and responding to client requests appropriately. Facilitating HTTP header field inferences on encrypted traffic may also allow some network administrators to avoid the integration of TLS termination proxies. A further potential use for the HTTP header inferences is malware detection, which has become increasingly important with the rise of encrypted traffic and malware's predictable use of encryption to obfuscate its network behavior. Website fingerprinting is yet a further potential use for the HTTP header inferences, which could have serious privacy implications, but could also be of interest when Tor is used.

Figure 5:
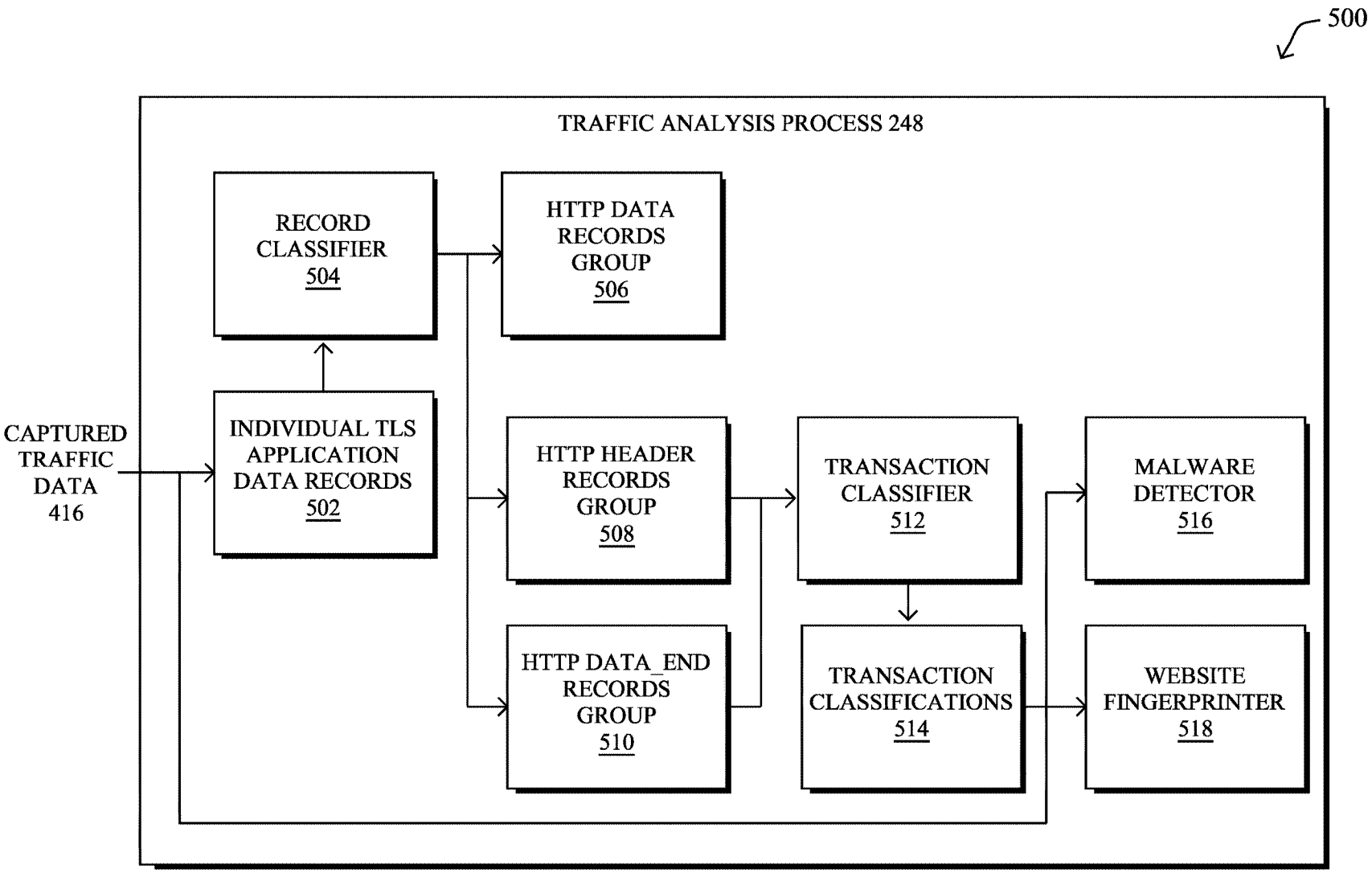
FIG. 5 illustrates an example architecture for inferring Hypertext Transfer Protocol (HTTP) header information from encrypted traffic.

FIG. 5 illustrates an example architecture 500 for inferring HTTP header information from encrypted traffic. As shown, traffic analysis process 248 may include any number of sub-processes and/or may access any number of memory locations. As would be appreciated, these sub-processes and/or memory locations may be located on the same device or implemented in a distributed manner across multiple devices, the combination of which may be viewed as a single system/device that executes traffic analysis process 248. Further, while certain functionalities are described with respect to the sub-processes and memory locations, these functions can be added, removed, or combined as desire, in further implementations.

In various embodiments, captured traffic data 416 may be divided into individual TLS application data records 502. Notably, the encrypted traffic may make use of several protocols, which could include, e.g., HTTP/1.1, HTTP/2, TLS 1.2 or another TLS version, and/or the Tor protocol. Certain differences between these various protocols may be highlighted, which can affect the steps performed by traffic analysis process 248.

For example, HTTP/1.1 is a stateless protocol that enables the exchange of requests and responses between a client and server. An HTTP/1.1 request begins with a request-line specifying the method, request-target, and HTTP-version of the request, and a response begins with a status-line specifying the HTTP-version, status-code, and reason-phrase. Following the request-line or status-line, there is a potentially unordered, case-insensitive list of header fields with their associated values. It is this status line's status-code, as well as many of the header fields and values (e.g., Referer, Server, Content-Type, etc.) for which traffic analysis process 248 may make inferences.

HTTP/1.1 supports pipelining, where a client can send two or more requests before receiving the server's response, and the server will then send a series of responses in the same order as they were requested.

Figure 6:
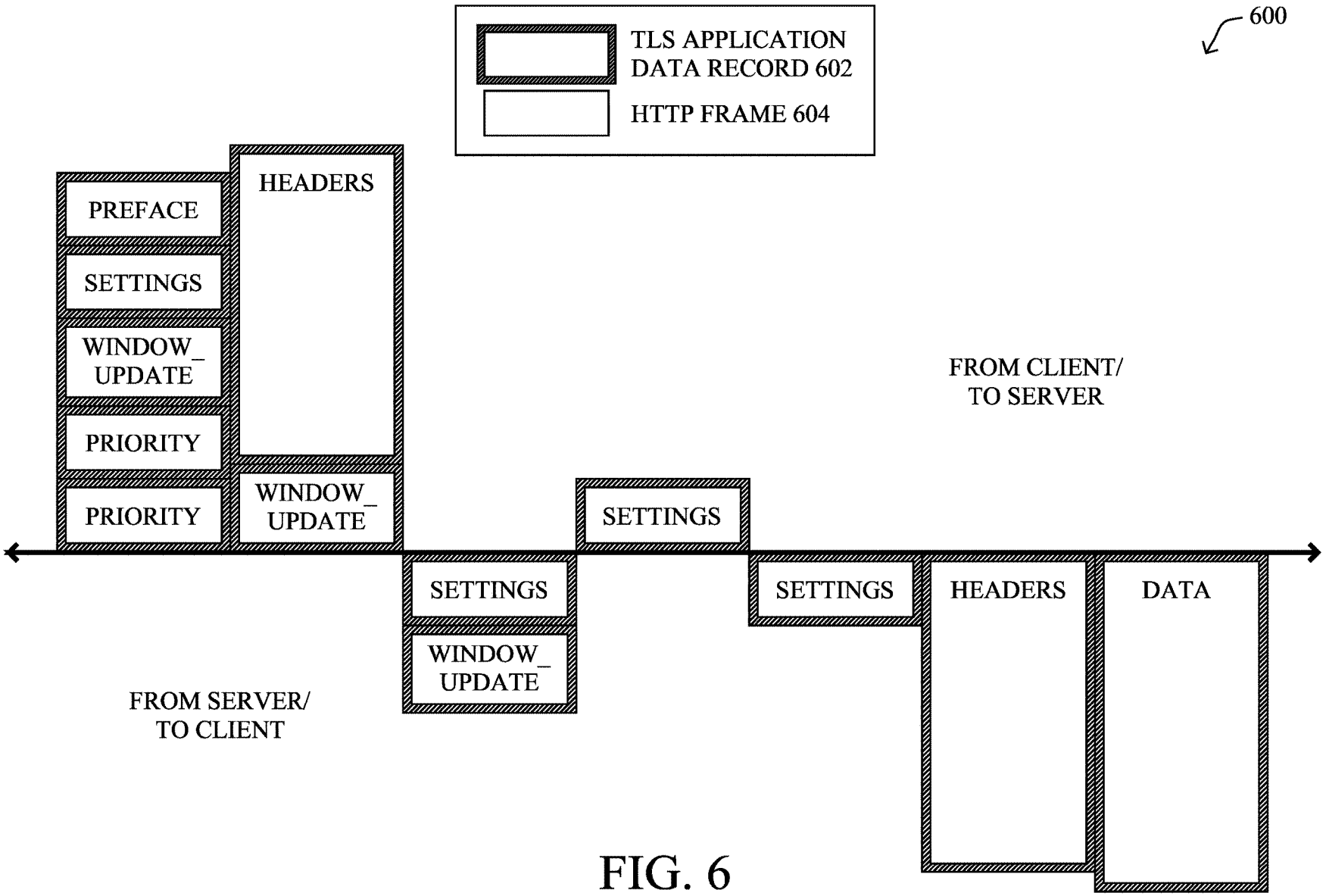
FIG. 6 illustrates an example of Hypertext Transfer Protocol (HTTP) traffic inside of a Transport Layer Security (TLS)-encrypted tunnel.

HTTP/2 was introduced to solve some of the shortcomings of HTTP/1.1., e.g., by introducing multiplexing and header compression. HTTP/2 can multiplex multiple streams over a single HTTP/2 connection by using various frames to communicate the state of different streams. FIG. 6 illustrates an example 600 of the creation of an HTTP/2 connection inside of a TLS tunnel. As shown, HTTP/2 frames 604 may be included within encrypted TLS application data records 602. In various embodiments, the captured traffic data 416 regarding TLS application data records 602 may be on a per record basis, giving way to individual TLS application data records 502 in FIG. 5 that are observed for a given connection between a client and server.

As shown in FIG. 6, the client begins an HTTP/2 connection by sending a fixed set of bytes indicating that the connection is HTTP/2 (e.g., in a preface frame 604), immediately followed by a SETTINGS frame 604 that conveys parameters related to the client's HTTP/2 configuration. In some cases, the client can also send addition frames 604, such as a WINDOW_UPDATE frame 604 for flow control management, a set of PRIORITY frames 604 that define the priority of the multiple streams in the connection, a HEADERS frame 604 containing the request header fields and values, and finally another WINDOW UPDATE frame 604.

In response, the server must begin an HTTP/2 connection by sending a SETTINGS frame 604 back to the client. After an additional exchange of SETTINGS frames 604, the server sends a HEADERS frame 604 containing the response header fields and values. Finally, the server may send a DATA frame 604 to the client that includes the requested data, such as webpage data, or the like. In many cases, header compression may also be applied to the HEADERS frames 604, such as by using HPACK or the like.

HTTP/1.1 requests and responses are also increasingly being secured by TLS, and many browser vendors have stated that they will not implement HTTP/2 without encryption. Generally, the TLS handshake begins with the exchange of client hello and server hello records that establish the cryptographic parameters needed to encrypt and authenticate data. The client and server can also negotiate the application layer protocol with these messages by using the application layer protocol negotiation extension, where the values http/1.1 and h2 reasonably refer to HTTP/1.1 and HTTP/2. After establishing a set of shared keys, the client and server each send change cipher spec and finished records designating the end of the TLS handshake. After the handshake is complete, the devices can now send encrypted application data records 602 containing application layer data (e.g., HTTP frames 604, as shown).

Another protocol that may be used in the context of encrypted traffic is the Tor protocol. Generally, Tor securely transmits and anonymizes TCP-based application layer protocols, e.g., HTTP, using a combination of TLS, its own encryption protocol, and an overlay network. The client creates a Tor connection by first negotiating a TLS handshake with a Tor entry node. After performing a Tor handshake, the client then constructs a circuit by sending a CREATE2 cell to the first onion router in the chain, where a cell is the basic unit of communication similar to an HTTP/2 frame. The onion router responds with a CREATED2 cell with the information needed to derive a pair of 128-bit AES keys to encrypt outgoing messages and decrypt incoming messages. The client sends a RELAY EXTEND2 cell to extend the circuit to an additional onion router, and will follow the same key establishment protocol with the contents of the returned RELAY EXTENDED2 cell. After repeating this multiple times, RELAY DATA cells are sequentially encrypted with the 128-bit AES keys of each onion router in the circuit's path. The contents of RELAY DATA cells can carry TLS records needed to perform an additional TLS handshake.

A JSON representation of an HTTP/1.1 GET request tunneled over TLS is, tunneled over Tor, and again tunneled over TLS is shown below:

```
{
"tls_records":[
...
    {
     "type":"app_data",
     "length":1052 ,
     "decrypted_data":{
          "protocol":"Tor",
          "length":1028 ,
          "cells":[
          {
               "circ_id":"xxxxxxxx",
               "cell_type":"RELAY",
               "command":"RELAY_DATA",
               "stream_id":"xxxx",
               "digest":"xxxxxxxx",
               "length":340 ,
               "decrypted_data":{
               "tls_records":[
                    {
                    "type":"app_data",
                    "length":335 ,
                    "decrypted_data":{
                         "method":"GET",
                         "uri":"/" ,
                         "v":"HTTP/1.1" ,
                         "headers":[
                         ...
                         ],
```

Referring again to FIG. 5, the techniques herein are purposely focused on inferring header information and other characteristics of the encrypted HTTP header records, instead of the actual content data being conveyed. However, before the values contained within an HTTP request or response can be inferred, architecture 500 must be able to distinguish between TLS records that contain an HTTP request or response, and those that do not. This classification problem can be framed as either a binary classification problem or, alternatively, as a multi-class classification problem. Accordingly, in various embodiments, traffic analysis process 248 may include a machine learning-based record classifier 504 that is configured to distinguish between the different types of HTTP records/frames that may be encrypted within the TLS records 502.

In one embodiment, record classifier 504 may perform a binary classification of a TLS record 502, labeling the record as either "including HTTP header information" or "including an HTTP data record"/"not including HTTP header information." In further embodiments, record classifier 504 may be trained as a multi-class classifier that is able to further distinguish between the different types of HTTP frames encrypted within the TLS records. For example, in one embodiment, record classifier 504 may be trained to label a given TLS record 502 as including an HTTP header frame, an HTTP data frame, an HTTP settings frame, or the like. In further embodiments, as shown, records classifier 504 may be trained to label a given TLS record 502 as either including an HTTP data record, an HTTP header record, or an HTTP "Data_End" record. Notably, this additional label may be used to analyze pipelined or multiplexed requests to subdivide a TLS flow into separate transactions. Alternatively, in yet another embodiment, an offset of packets from an identified header record could be used to define the assumed end of a given transaction.

From the labeling performed by record classifier 504, TLS records 502 may be broken up into different groups, according to their applied label/classification. Notably, the TLS records 502 that have been labeled as containing HTTP data records can be segregated into the HTTP data records group 506, which can be ignored, in many implementations, for privacy reasons. Likewise, record classifier 504 may form HTTP header records group 508 of TLS records 502 that include HTTP headers and/or HTTP Data_End records group 510 of TLS records 502 that signal the end of a given HTTP transaction.

According to various embodiments, traffic analysis process 248 may also include a machine learning-based transaction classifier 512 that is configured to apply one or more labels to an HTTP transaction contained within the TLS records 502. Such labels may be inferred characteristics (e.g., fields and/or field values) that might otherwise be available for analysis by traffic analysis process 248, but are instead encrypted using TLS. For example, transaction classifier 512 may be configured to estimate any or all of the following transaction labels for a given transaction:

TABLE 1

| Characteristic | HTTP/1.1 Label Set | HTTP/2 Label Set |
|---|---|---|
| Method (request) | GET, POST, OPTIONS, HEAD, PUT | GET, POST, OPTIONS, HEAD |
| Content-Type (request) | Json, plain | Json, plain |
| Status-Code (response) | 100, 200, 204, 206, 301, 302, 303, 304, 307, 404 | 200, 204, 206, 301, 302 303, 304, 307, 404 |

TABLE 1-continued

| Characteristic | HTTP/1.1 Label Set | HTTP/2 Label Set |
|---|---|---|
| Content-Type (response) | html, javascript, image, video, css, octet, json, font, plain | html, javascript, image, video, css, octet, son, font, plain, protobuf |
| Server (response) | nginx-1.13/1.12/1.11/1.10, nginx-1.8/1.7/1.4, nginx, openresty, cloudflare-nginx, Apache, Coyote/1.1, AmazonS3, NetDNA/2.2, IIS-7.5/8.5, jetty-9.4/9.0 | nginx-1.13/1.12/1.11/1.10, nginx-1.6/1.4/1.3, nginx, cloudflare-nginx, Apache Coyote/1.1, IIS/8.5, Golfe2, sffe, cafe, ESF, GSE, gws, UploadServer, NetDNA/2.2, Akamai, Google, Tengine, Dreamlab, AmazonS3 |

As would be appreciated, other transaction labels are also possible, in further embodiments. For example, in some embodiments, transaction classifier 512 may be configured to make a binary classification of an HTTP transaction, to label whether the transaction is estimated to use any or all of the following optional HTTP fields: cookie, referer, upgrade-insecure-requests, via, set-cookie, origin, etag, etc. Such information can still be of value, depending on the security function performed on the overall traffic data. In addition, while the field values above represent several possible sets of transaction labels, these labels may change over time, such as with newer versions of the HTTP protocol, and the techniques herein are not limited as such.

In some embodiments, transaction classifier 512 may use two categories of data features to classify the HTTP semantics/estimate the transaction label(s). These categories include: 1.) features that are dependent on the location of the TLS record containing the HTTP request or response, and 2.) features derived from all packets in a connection. For the location-specific feature set, transaction classifier 512 may extract out the following features from each of the TLS records:

- The number of packets
- The number of packets with the TCP PUSH flag set
- The average packet size in bytes
- The type code of the TLS record
- The TLS record size in bytes
- The direction of the TLS record (e.g., whether the record was sent to or from the client)

Transaction classifier 512 may treat the counts and sizes as real-valued features, the TLS type code as a categorical feature, and the direction as a categorical feature where '0' indicates client→server and '1' indicates server→client, and '2' indicates the absence of a TLS record. All features except direction may be set to '0' if a TLS record does not exist, e.g., when the current TLS record is near the end of the connection. In other words, transaction classifier 512 may assess the available features of the TLS records (e.g., those TLS records in group 508 that include HTTP header information), to estimate the transaction label(s) for the underlying HTTP transaction.

As noted above, transaction classifier 512 may iteratively classify the transactions of a give connection, thereby leveraging the previous classification results to help classify the current transaction under analysis. This is done because many of the HTTP semantics being inferred are dependent on one another (e.g., the response content-type is dependent on the server value, etc. For example, transaction classifier 512 may classify the $n^{th}$ transaction in an observed connection between a client and server, transaction classifier 512 may also take into account the classification results for the n−1 previously classified transactions of the session. Pseudocode for this iterative classification is as follows, in some embodiments:

```
procedure ITERATIVE SEMANTICS CLASSIFY
    given:
        conn := features describing connection
    alp ← application_layer_protocol(conn)
    recs ← classify_message_types(conn; alp)
    for rec ∈ recs do:
        if rec.type ≠ Headers then:
            continue
        get_record_features(rec; alp)
        classify_semantics(rec; alp)
    while not converged do:
        for rec ∈ recs do:
            if rec.type ≠ Headers then:
                continue
            get_record_features(rec; alp)
            get_inferred_features(rec; alp)
            classify_semantics(rec; alp)
```

Training of classifiers 504 and 512 may be achieved by obtaining decrypted examples of TLS records and capturing the features of the records. For example, preliminary testing of the techniques herein was performed by executing various web browsers within Linux-based virtual machines (VMs) to initiate connections with a large number of servers/websites. For example, in the cases of Firefox 58.0 and Chrome 63.0, the master secrets were extracted through the SSLKEYLOGFILE environment variable and network traffic was collected with tcpdump. The specified browser and site pair were then launched in private mode and killed after 15 seconds, allowing the master secrets to be captured in the dumps. In the case of Tor Browser 7.0.11, memory snapshots were taken to capture the master secrets, as this browser explicitly prevents the export of its key material due to security concerns.

Decryption of the TLS records allows for the labeling of the records based on their contents. For example, a particular decrypted TLS record may indicate that the response content-type is "javascript," thereby associating this label with the other characteristics of the record that do not require decryption, such as the number of packets, packet sizes, direction of communication, and the like. In turn, this information can be used to train transaction classifier 512 to apply an estimated label to the TLS records for a given transaction. A similar approach of decrypting TLS records can also be taken to train record classifier 504. As would be appreciated, while record classifier 504 and transaction classifier 512 are shown in FIG. 5 as separate classifiers, their functions may be combined into a single classification routine, in further embodiments.

In various embodiments, the inferred/estimated transaction classifications 514 may be combined with the existing captured traffic data 416, for purposes of performing a network security function. For example, the existing captured traffic data 416 (e.g., SPLT information, byte and/or packet count, TLS metadata, etc.) may be augmented with the inferred/estimated transaction classifications 514 from transaction classifier 512 (e.g., that the HTTP status-code is estimated to be '204' for the underlying HTTP transaction, etc.). Example network security functions may include, but are not limited to, analysis by a malware detector 516, a website fingerprinter 518, or the like.

Generally speaking, malware detector 516 may itself include a machine learning-based classifier that is configured to assess the available traffic information in captured traffic data 416 from the encrypted traffic, as well as the inferred HTTP information in transaction classifications 514, to classify the traffic as either malware-related or benign. In other words, even though the traffic remains encrypted, traffic analysis process 248 may determine whether the encrypted traffic is likely malware-related. In turn, malware 516 may cause the performance of a mitigation action, such as blocking traffic associated with the client and/or server, generating an alert regarding the detection, or the like.

Website fingerprinter 518 may generally operate to distinguish between trusted websites and fraudulent or otherwise malicious websites. In turn, this information can be used to block traffic involving these non-trusted websites, help protect against website spoofing, and the like. Such a function may be of interest, particular when the Tor browser is used by the client to establish the connection.

Preliminary testing of the techniques herein was performed as follows. First, training data was generated by executing Firefox 58.0, Chrome 63.0, and Tor Browser 7.0.11 in VMs, and their respective master secrets were used to decrypt their traffic. In particular, for Firefox, 31,175 HTTP/1.1 and 29,916 HTTP/2 connections were decrypted. For Chrome, 242,036 HTTP/1.1 and 137,698 HTTP/2 connections were decrypted. Finally, 6,067 TLS-Tor and 50,799 HTTP/1.1 connections were decrypted for the Tor Browser. If a Tor tunnel or underlying stream was not decrypted, that sample was discarded. Datasets were further created to test the malware and website fingerprinting functions, e.g., by executing malware in a sandbox environment and capturing its resulting traffic information. The resulting datasets used during preliminary testing are as follows:

TABLE 2

| Dataset Name | TLS Connections | HTTP/1.1 Transactions | HTTP/2 Transactions |
|---|---|---|---|
| firefox_h | 61,091 | 72,828 | 132,685 |
| chrome_h | 379,734 | 515,022 | 561,666 |
| tor_h | 6,067 | 50,799 | 0 |
| malware_h | 86,083 | 182,498 | 14,734 |
| enterprise_m | 171,542 | — | — |
| malware_m | 73,936 | — | — |
| tor_open_w | 5,000 | 54,079 | 0 |
| tor_censor_w | 2,500 | 31,707 | 0 |

As shown above in Table 2, the datasets ending in _h were primarily used to test the header classification, the datasets ending in _m were used to test malware classification, and the datasets ending in _w were used to test website fingerprinting. Those lacking an entry represent a lack of ground truth.

For the header classification tests involving HTTP/1.1, there were an average of ~2.1 to ~8.4 transactions per TLS connection, depending on the dataset, with Tor being a significant outlier. In these experiments, the first 7 days of a dataset were used for training and the second 7 days of the same dataset for testing. While having perfect ground truth of the application and the accompanying decrypted dataset to train suitable models may be unrealistic in most situations, the experiments were framed in this way to prove the feasibility of our approach. From the preliminary results, the techniques herein were able to identify TLS records containing HTTP header fields with an F1 score of over 0.99 for all datasets except for tor h which had an F1 score of _0.87. This initial experiment highlights the relative difficulty that the Tor protocol poses for traffic analysis compared to standalone TLS.

Most of the other HTTP/1.1 experiments follow a similar pattern with the Tor_h results significantly worse than the other datasets. However, even in the case of Tor, the techniques herein were able to make a binary classification of the cookie, referer, and upgrade-insecure-requests request fields (e.g., whether these fields were present), each with an F1 score over 0.75.

Figure 7D:
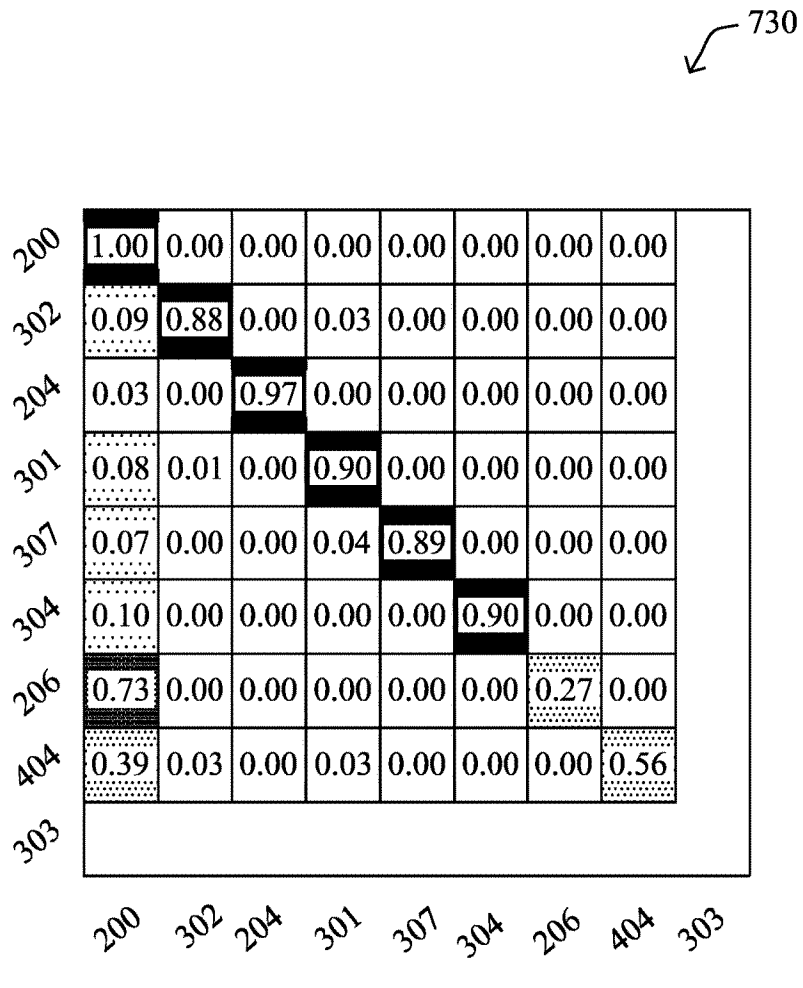
Figure 7C:
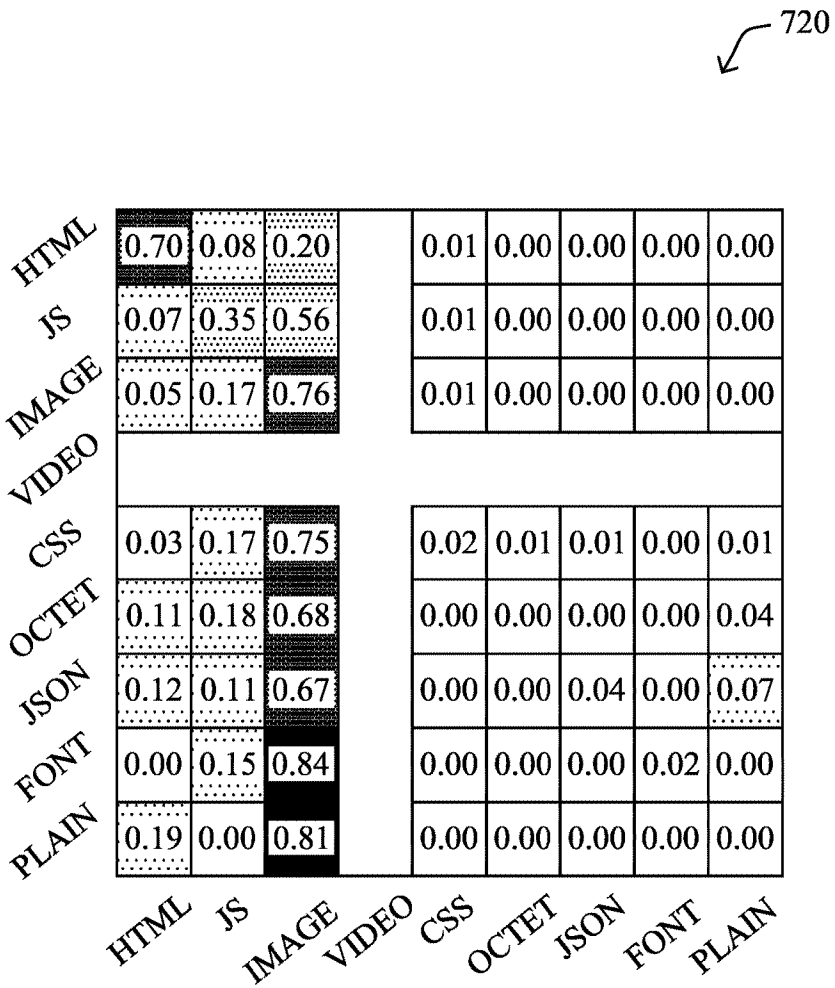

For the other datasets, the techniques herein were able to achieve surprisingly competitive results across the majority of the problems. The techniques herein were also able to effectively model many of the problems based on malware_h, which had a much greater diversity of TLS clients and less overlap in sites visited in the training and testing datasets. FIGS. 7A, 7B, and 7C show the full confusion matrices 700, 710, and 720 for the HTTP/1.1 response Content-Type header field value for chrome_h, malware h, and Tor_h, respectively. For this problem, the techniques herein were able to achieve an unweighted F1 scores of 0.919, 0.770, and 0.236, respectively, for these datasets. There was some overfitting to the majority class, image, which had roughly twice as many samples in each dataset than the next most represented class. Despite minor overfitting in chrome_h and malware_h, the preliminary results confirmed the ability of this approach to infer the value of the HTTP/1.1 response Content-Type header field value in an encrypted TLS tunnel. Also of note, preliminary testing showed that the techniques herein were able to identify the 18-class Server header with F1 scores of 0.916, 0.977, and 0.814 for firefox_h, chrome_h, and malware_h, respectively.

For the HTTP/2 header testing, there were a total of 132,685, 561,666, and 14,734 HTTP/2 transactions in firefox_h, chrome_h, and malware_h, respectively. This gives an average of ~4 HTTP/2 transactions per TLS connection across the datasets. Experiments with these datasets followed the same structure as the HTTP/1.1 experiments. There were no HTTP/2 transactions in tor_h, which is a result of the Tor Firefox process only being configured to offer http/1.1 in the client's application layer protocol negotiation TLS extension. Based on the preliminary testing, the techniques herein were able to identify TLS records containing HTTP header fields with an F1 score of over 0.98 for all datasets. This slight drop in performance was expected due to the more advanced flow control mechanisms implemented by HTTP/2. In the datasets, ~55% of the TLS-HTTP/2 connections employed some form of pipelining or multiplexing for HTTP transactions. Only ~15% of the TLS-HTTP/1.1 connections employed pipelining. The malware_h HTTP/2 results were worse than the malware_h HTTP/1.1 results for most problems, but this can be attributed to having significantly less data in the case of HTTP/2. Both chrome_h and firefox_h datasets had mostly comparable performance to the HTTP/1.1 experiments.

Compared to the HTTP/1.1 results, the iterative classification performed exceptionally well in the HTTP/2 case on some problems: request method, request Cookie, request Origin, response Content-Type, and response Server. In these cases, the iterative classification was able to effectively leverage HTTP/2's greater number of HTTP transactions per TLS connection to improve performance. FIG. 7D shows the confusion matrix 730 for the HTTP/2 status-code header on firefox_h, which had an F1 score and accuracy of 0.856 and 0.989, respectively. Similar to other problems, the majority of the misclassifications are due to underrepresented classes being assigned to well represented classes, e.g., 206→200. A more diverse and representative dataset should help to mitigate some of these issues.

To test whether augmenting captured traffic characteristics with inferred HTTP semantics improved malware detection, the enterprise_m and malware_m datasets from Table 2 above were used. Two feature sets were explored: a standard feature set that included 108 connection-dependent features, as well as an enriched feature set that included these standard features and the inferred features using the techniques herein. The results were as follows:

TABLE 3

| Feature Set | F1 Score | Precision | Recall | Acc |
|---|---|---|---|---|
| Standard | 0.951 | 0.951 | 0.915 | 0.958 |
| Enriched | 0.979 | 0.984 | 0.959 | 0.982 |

As Table 3 demonstrates, applying the iterative HTTP semantics classifier and learning an intermediate representation of the HTTP transactions within the encrypted TLS tunnel significantly helps the performance of the classifier. The header inferences increased the F1 score from 0.951 to 0.979, and had similar impacts to precision and recall. The performance of the enriched feature set would still yield too many false positives on a real network, but it is only looking at data features related to a single TLS session. The techniques herein could easily be incorporated into a more comprehensive network monitoring architecture that correlates multiple network connections and independent data sources.

Figure 8:
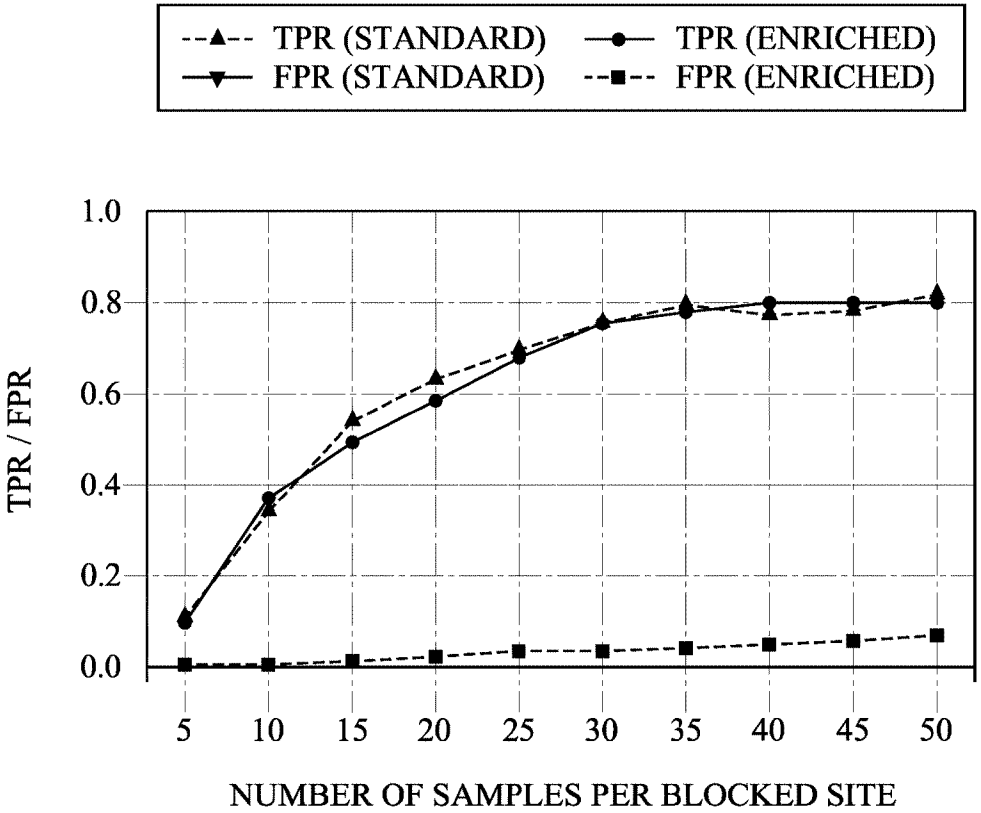
FIG. 8 illustrates a plot of a learning curve for website fingerprinting.

With respect to testing the techniques herein for purposes of website fingerprinting, the tor_open_w and tor_censor_w datasets in Table 2 were used. The tor_censor_w dataset contained 50 samples per monitored site from a list of 50 sites currently blocked in some countries pertaining to information dissemination (e.g., twitter.com), covert communication (e.g., torproject.org), and pornographic imagery. The tor_open_w dataset contained 5,000 non-monitored samples where each sample is a unique connection to a website in the Alexa top 10,000 list. These sites were contacted in order, and the first 5,000 sites were selected that properly decrypted and did not have any HTTP requests to a monitored site. Plot 800 in FIG. 8 provides the results of this experiment as the number of unique samples were adjusted per monitored site from 5 to 50, in increments of 5. The introduction of the header inferences seem to be strictly adding noise that is effectively filtered out during weight adjustment.

Figure 9:
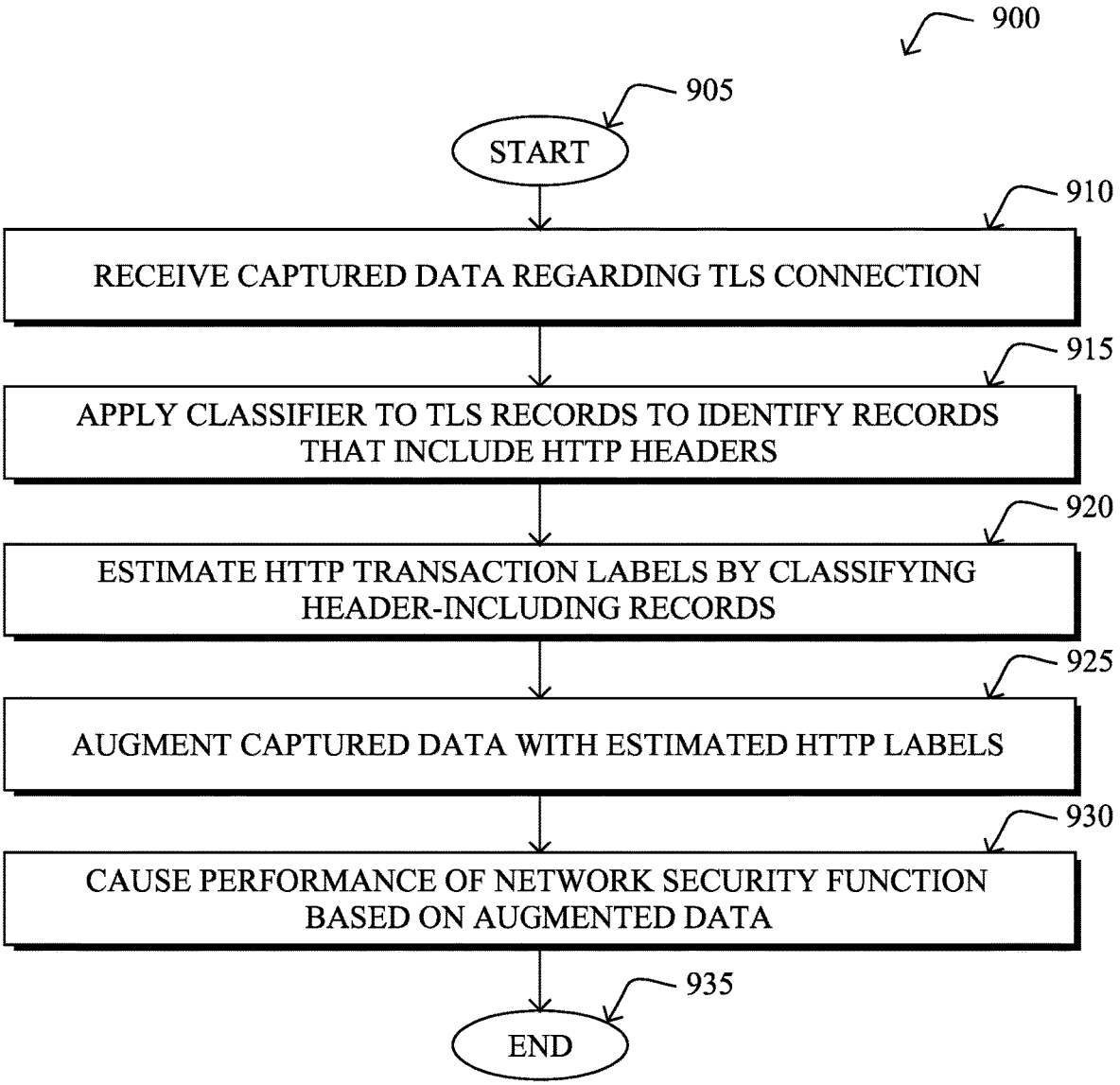
FIG. 9 illustrates an example simplified procedure for leveraging point inferences for HTTP transactions.

FIG. 9 illustrates an example simplified procedure for leveraging point inferences for HTTP transactions in a network in accordance with one or more embodiments described herein. For example, a non-generic, specifically configured device (e.g., device 200) may perform procedure 900 by executing stored instructions (e.g., process 248), to provide a traffic analysis service to a network. The procedure 900 may start at step 905, and continues to step 910, where, as described in greater detail above, the service may receive captured data a Transport Layer Security (TLS) connection between a client and a server. Such captured data may include any number of measurements, characteristics, or statistics regarding the observed traffic of the connection. In various cases, this data may also be broken down by TLS record.

At step 915, as detailed above, the service may apply a first machine learning-based classifier to TLS records from the traffic data, to identify a set of the TLS records that include Hypertext Transfer Protocol (HTTP) header information. Notably, not all TLS records for which data is captured are of interest with respect to inferring/estimating the HTTP semantics of the traffic. Thus, the service may use a classifier to distinguish between TLS records that include HTTP header frames and those that do not.

At step 920, the service may estimate one or more HTTP transaction labels for the connection, as described in greater detail above. In various embodiments, the service may do so by applying a second machine learning-based classifier to the identified set of TLS records that include HTTP header information. Example transaction labels may be indicative of an HTTP method (e.g., GET, POST, etc.), an HTTP content type (e.g., html, javascript, image, plain, etc.), an HTTP status code (e.g., 200, 302, etc.), or a type associated with the server (nginx/1.13, nginx/1.12, etc.). In further embodiments, a transaction label may be a binary classification label indicative of the underlying HTTP traffic including a cookie field, referer field, upgrade-insecure-requests field, etc.

At step 925, as detailed above, the service may augment the captured traffic data with the one or more HTTP transaction labels. For example, the service may augment SPLT information, captured TLS metadata (e.g., from the TLS headers), or the like, with the inferred/estimated HTTP transaction information (e.g., the content type, method, etc.).

At step 930, the service may cause the performance of a network security function based on the augmented traffic data, as described in greater detail above. In one embodiment, this may entail sending the augmented traffic data for classification by a malware classifier. In another embodiment, this may entail using the augmented traffic data for website fingerprinting. Other security functions are also possible. Procedure 900 then ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for many of the underlying HTTP protocol features to be inferred from encrypted traffic, without compromising the HTTPS encryption itself. Such inferred information can be used to augment other captured information about the traffic, thereby providing an enhanced dataset that can be assessed by one or more network security functions. Because the techniques herein do not require actual decryption of the encrypted traffic, the privacy of the user remains intact.

While there have been shown and described illustrative embodiments that provide for inferring/estimating HTTP features in HTTPS traffic, it is to be understood that various other adaptations and modifications may be made within the spirit and scope of the embodiments herein. For example, while certain embodiments are described herein with respect to using certain models for purposes of classification, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a traffic analysis service, captured traffic data regarding a Transport Layer Security (TLS) connection between a client and a server;

applying, by the traffic analysis service, a first machine learning-based classifier to TLS records from the traffic data to label each of the TLS records as either a TLS record that includes Hypertext Transfer Protocol (HTTP) header information comprising one or more HTTP header fields or a TLS record that does not include the HTTP header information;

estimating, by the traffic analysis service, one or more HTTP transaction labels for the connection by applying a second machine learning-based classifier to the identified set of TLS records that include the HTTP header information;

augmenting, by the traffic analysis service, the captured traffic data with the one or more HTTP transaction labels; and causing, by the traffic analysis service, performance of a network security function based on the augmented traffic data, wherein the TLS records remain encrypted during classification by the first and second machine learning-based classifiers.

2. The method as in claim 1, wherein causing performance of the network security function comprises:

determining, by the traffic analysis service and based on the augmented traffic data, whether the TLS connection is malware-related, wherein the augmented traffic data comprises captured TLS metadata and data indicative of packet or record lengths from the connection.

3. The method as in claim 1, wherein the connection between the client and the server uses the Tor protocol.

4. The method as in claim 1, wherein the client executes a web browser to form the connection.

5. The method as in claim 1, wherein the one or more HTTP transaction labels is indicative of at least one of: an HTTP method, an HTTP content type, an HTTP status code, or a type associated with the server.

6. The method as in claim 1, wherein the one or more HTTP transaction labels is indicative of at least one of: a cookie, referer, upgrade-insecure-requests, via, set-cookie, origin, or etag header field.

7. The method as in claim 1, wherein estimating the one or more HTTP transaction labels for the connection comprises:

iteratively classifying transactions of the connection by classifying a particular one of the transactions based in part on classification results from one or more previously classified transactions of the connection.

8. The method as in claim 1, wherein the second machine learning-based classifier is a multi-class classifier.

9. An apparatus, comprising:

one or more network interfaces to communicate with a network;

a processor coupled to the network interfaces and configured to execute one or more processes; and a memory configured to store a process executable by the processor, the process when executed configured to:

receive captured traffic data regarding a Transport Layer Security (TLS) connection between a client and a server;

apply a first machine learning-based classifier to TLS records from the traffic data to label each of the TLS records as either a TLS record that includes Hypertext Transfer Protocol (HTTP) header information comprising one or more HTTP header fields or a TLS record that does not include the HTTP header information;

estimate one or more HTTP transaction labels for the connection by applying a second machine learning-based classifier to the identified set of TLS records that include the HTTP header information;

augment the captured traffic data with the one or more HTTP transaction labels; and cause performance of a network security function based on the augmented traffic data, wherein the TLS records remain encrypted during classification by the first and second machine learning-based classifiers.

10. The apparatus as in claim 9, wherein the apparatus causes performance of the network security function by:

determining, based on the augmented traffic data, whether the TLS connection is malware-related, wherein the augmented traffic data comprises captured TLS metadata and data indicative of packet or record lengths from the connection.

11. The apparatus as in claim 9, wherein the connection between the client and the server uses the Tor protocol.

12. The apparatus as in claim 9, wherein the client executes a web browser to form the connection.

13. The apparatus as in claim 9, wherein the one or more HTTP transaction labels is indicative of at least one of: an HTTP method, an HTTP content type, an HTTP status code, or a type associated with the server.

14. The apparatus as in claim 9, wherein the one or more HTTP transaction labels is indicative of at least one of: a cookie, referer, upgrade-insecure-requests, via, set-cookie, origin, or etag header field.

15. The apparatus as in claim 9, wherein the apparatus estimates the one or more HTTP transaction labels for the connection by:

iteratively classifying transactions of the connection by classifying a particular one of the transactions based in part on classification results from one or more previously classified transactions of the connection.

16. The apparatus as in claim 9, wherein the second machine learning-based classifier is a multi-class classifier.

17. A tangible, non-transitory, computer-readable medium storing program instructions that cause a traffic analysis service to execute a process comprising:

receiving, at the traffic analysis service, captured traffic data regarding a Transport Layer Security (TLS) connection between a client and a server;

applying, by the traffic analysis service, a first machine learning-based classifier to TLS records from the traffic data to label each of the TLS records as either a TLS record that includes Hypertext Transfer Protocol (HTTP) header information comprising one or more HTTP header fields or a TLS record that does not include the HTTP header information;

estimating, by the traffic analysis service, one or more HTTP transaction labels for the connection by applying a second machine learning-based classifier to the identified set of TLS records that include the HTTP header information;

augmenting, by the traffic analysis service, the captured traffic data with the one or more HTTP transaction labels; and causing, by the traffic analysis service, performance of a network security function based on the augmented traffic data, wherein the TLS records remain encrypted during classification by the first and second machine learning-based classifiers.

18. The computer readable medium as in claim 17, wherein causing performance of the network security function comprises:

determining, by the traffic analysis service and based on the augmented traffic data, whether the TLS connection is malware-related, wherein the augmented traffic data comprises captured TLS metadata and data indicative of packet or record lengths from the connection.

*19. A method for classifying an encrypted flow, comprising:*

*receiving, at a network device, a plurality of packets associated with a first encrypted flow traversing a network;*

*collecting telemetry data from the plurality of packets associated with the first encrypted flow, wherein at least a portion of the telemetry data is collected from packets encrypted according to a cryptographic protocol, wherein the telemetry data includes cryptographic protocol data, and wherein the telemetry data further includes at least one of a source IP address, a destination IP address, a destination port, a start time of the first encrypted flow, a stop time of the first encrypted flow, a protocol associated with the first encrypted flow, a number of packets of the first encrypted flow, a number of bytes of the first encrypted flow, a sequence of TLS record lengths and types, a sequence of TCP packet lengths and flags, a number of bytes extracted from the first encrypted flow, a sequence of packet lengths and times from the first encrypted flow, a series of application lengths and times from the first encrypted flow, or byte distribution data; and*

*sending the telemetry data to a traffic analysis process, wherein the traffic analysis process comprises:*

*using the telemetry data in conjunction with a first machine learning classifier to make a first assessment whether the first encrypted flow is part of a set of traffic flows caused by malware in the network,*

*using the first assessment as an input to a second machine learning process that generates a classification of the first encrypted flow, and*

*using the classification of the first encrypted flow from the second machine learning process to modify a processing of the first encrypted flow.*

*20. The method of claim 19, wherein the traffic analysis process is performed at a second network device.*

*21. The method of claim 19, wherein the traffic analysis process receives the telemetry data from a plurality of network devices.*

*22. The method of claim 19, wherein using the telemetry data in conjunction with the first machine learning classifier to make a first assessment comprises using the cryptographic protocol data as input to the first machine learning classifier.*

*23. The method of claim 22, wherein using the cryptographic protocol data as input to the first machine learning*

*classifier comprises using encryption certificate data as an input to the first machine learning classifier.*

*24. The method of claim 19, wherein the cryptographic protocol data includes encryption certificate data.*

*25. The method of claim 19, wherein using the telemetry data in conjunction with the first machine learning classifier to make a first assessment comprises using at least one of the source IP address, the destination IP address, or the destination port as an input to the first machine learning classifier.*

*26. The method of claim 19, wherein using the telemetry data in conjunction with the first machine learning classifier to make the first assessment comprises using at least one of the start time of the first encrypted flow, the stop time of the first encrypted flow, the protocol associated with the first encrypted flow, the number of packets of the first encrypted flow, or the number of bytes of the first encrypted flow as input to the first machine learning classifier.*

*27. The method of claim 19, wherein using the telemetry data in conjunction with a first machine learning classifier to make a first assessment comprises using at least one of the sequence of TLS record lengths and types, the sequence of TCP packet lengths and flags, or the number of bytes and packets as an input to the first machine learning classifier.*

*28. The method of claim 19, wherein using the first assessment as an input to a second machine learning process further comprises using a plurality of telemetry data from a plurality of flows as inputs to the second machine learning process.*

*29. The method of claim 28, wherein using the plurality of telemetry data decreases a false positive rate of the second machine learning process.*

*30. A method for creating and operating a multi-step classifier for an encrypted flow, the method comprising:*

*collecting telemetry data from a first plurality of encrypted flows using a plurality of traffic capture services located on network paths between clients and servers, the first plurality of encrypted flows including both malicious and benign flows, wherein at least a portion of the telemetry data is collected from packets encrypted according to a cryptographic protocol, wherein the telemetry data includes cryptographic protocol data, and wherein the telemetry data further includes at least one of a source IP address, a destination IP address, a destination port, a start time of any of the first plurality of encrypted flows, a stop time of any of the first plurality of encrypted flows, a protocol associated with any of the first plurality of encrypted flows, a number of packets of any of the first plurality of encrypted flows, a number of bytes of any of the first plurality of encrypted flows, a sequence of TLS record lengths and types, a sequence of TCP packet lengths and flags, a number of bytes extracted from any of the first plurality of encrypted flows, a sequence of packet lengths and times from any of the first plurality of encrypted flows, a series of application lengths and times from any of the first plurality of encrypted flows, or byte distribution data;*

*using the telemetry data to create a first trained machine learning classifier to generate a classification of features present in the first plurality of encrypted flows;*

*using the telemetry data to create a second trained machine learning classifier to classify flows as malicious or benign, based at least in part on the classification of features from the first trained machine learning classifier;*

*receiving second telemetry data from an unclassified encrypted flow;*

*using the first trained machine learning classifier to make an inference regarding the unclassified encrypted flow; and*

*using the second trained machine learning classifier to classify the unclassified encrypted flow as malicious or benign using the second telemetry data and the inference made by the first trained machine learning classifier.*

*31. The method of claim 30, wherein use of a plurality of telemetry data decreases a false positive rate of the second trained machine learning classifier.*

*32. The method of claim 30, wherein the classification of the unclassified encrypted flow is based in part on pattern changes in flows other than the unclassified encrypted flow.*

* * * * *